US00RE42079E

(19) United States
(12) Reissued Patent
Tate et al.

(10) Patent Number: US RE42,079 E
(45) Date of Reissued Patent: *Jan. 25, 2011

(54) METHOD AND APPARATUS ALLOWING A BATTERY TO REGAIN CHARGE IN A HANDHELD DEVICE WITHOUT AN APPLIED EXTERNAL CHARGE WHILE STILL SUPPLYING POWER SELECTED DESIGNATED COMPONENTS

(75) Inventors: Joe Tate, San Jose, CA (US); Sean O'Hara, San Mateo, CA (US); Gary Responte, Fremont, CA (US)

(73) Assignee: Palm, Inc., Sunnyvale, CA (US)

( * ) Notice: This patent is subject to a terminal disclaimer.

(21) Appl. No.: 11/347,784

(22) Filed: Feb. 3, 2006

Related U.S. Patent Documents

Reissue of:
(64) Patent No.: 6,687,839
Issued: Feb. 3, 2004
Appl. No.: 09/588,108
Filed: May 31, 2000

(51) Int. Cl.
*G06F 1/26* (2006.01)
*G06F 1/28* (2006.01)
*G06F 1/30* (2006.01)
*G06F 1/32* (2006.01)

(52) U.S. Cl. ..... 713/324; 713/300; 713/310; 713/320; 713/323; 713/330; 713/340

(58) Field of Classification Search ..... 713/324
See application file for complete search history.

(56) References Cited

U.S. PATENT DOCUMENTS 3,744,034 A * 7/1973 Paul ..... 711/164
4,595,880 A * 6/1986 Patil ..... 324/427
4,860,372 A * 8/1989 Kuzunuki et al. ..... 382/189
4,972,496 A * 11/1990 Sklarew ..... 382/187
5,231,351 A * 7/1993 Kordts et al. ..... 324/166
5,231,381 A * 7/1993 Duwaer ..... 340/712
5,305,394 A * 4/1994 Tanaka ..... 382/189
5,349,668 A * 9/1994 Gladstein et al. ..... 713/340
5,373,227 A * 12/1994 Keeth ..... 323/313
5,389,745 A * 2/1995 Sakamoto ..... 178/18.03
5,434,929 A * 7/1995 Beernink et al. ..... 382/187
5,442,794 A * 8/1995 Wisor et al. ..... 713/340
5,444,192 A * 8/1995 Shetye et al. ..... 178/18.09
5,452,371 A * 9/1995 Bozinovic et al. ..... 382/187
5,528,743 A * 6/1996 Tou et al. ..... 715/234

(Continued)

FOREIGN PATENT DOCUMENTS

DE 3542765 A1 * 6/1987
EP 560510 A1 * 9/1993
GB 2371376 A * 7/2002

OTHER PUBLICATIONS

Lu, Y.–H.; Simunic, T.; De Micheli, G.; "Software controlled power management", Hardware/Software Codesign, 1999. (Codes '99) Proceedings of the Seventh International Workshop on, 1999, pp. 157–161.*

(Continued)

*Primary Examiner*—Thomas Lee
*Assistant Examiner*—Eric Chang
(74) *Attorney, Agent, or Firm*—Mahamedi Paradice Kreisman LLP

(57) ABSTRACT

An embodiment includes a power management method for regulating power to a handheld computer. A source voltage is received from a battery module. The source voltage is regulated to power a plurality of internal components, including a processor and a memory. If the source voltage is detected to be less than a designated threshold, the plurality of internal components powered by the source voltage are reduced to allow a charge of the battery module to increase in absence of an external charge.

39 Claims, 8 Drawing Sheets

U.S. PATENT DOCUMENTS

| | | | | | |
|---|---|---|---|---|---|
| 5,532,524 | A | * | 7/1996 | Townsley et al. | 713/321 |
| 5,534,892 | A | * | 7/1996 | Tagawa | 345/173 |
| 5,556,811 | A | * | 9/1996 | Agatstein et al. | 438/106 |
| 5,581,772 | A | * | 12/1996 | Nanno et al. | 713/340 |
| 5,615,284 | A | * | 3/1997 | Rhyne et al. | 382/187 |
| 5,621,817 | A | * | 4/1997 | Bozinovic et al. | 382/189 |
| 5,630,148 | A | * | 5/1997 | Norris | 713/322 |
| 5,698,822 | A | * | 12/1997 | Haneda et al. | 178/18.01 |
| 5,710,931 | A | * | 1/1998 | Nakamura et al. | 713/323 |
| 5,717,936 | A | * | 2/1998 | Uskali | 713/340 |
| 5,784,295 | A | * | 7/1998 | Hinohara | 702/63 |
| 5,784,626 | A | * | 7/1998 | Odaohara | 713/300 |
| 5,815,820 | A | * | 9/1998 | Kiem et al. | 455/575.7 |
| 5,841,901 | A | * | 11/1998 | Arai et al. | 382/187 |
| 5,870,685 | A | * | 2/1999 | Flynn | 455/573 |
| 5,915,002 | A | * | 6/1999 | Shimosako | 379/93.07 |
| 6,005,819 | A | * | 12/1999 | Shin | 365/226 |
| 6,112,249 | A | * | 8/2000 | Bader et al. | 709/239 |
| 6,243,831 | B1 | * | 6/2001 | Mustafa et al. | 713/324 |
| 6,266,776 | B1 | * | 7/2001 | Sakai | 713/300 |
| 6,304,823 | B1 | * | 10/2001 | Smit et al. | 713/321 |

OTHER PUBLICATIONS

Gray, R. et al., "Efficient MC68HC08 programming: reduce cycle count and improving code density", Dr. Dobb's Journal, vol. 20, No. 5, May 1995, pp. 70–75.*

Ruley, J. et al., "Handheld–to–Handheld Combat", Windows Magazine, No. 811, p. 55, Nov. 1997.*

Dayton, D., "FRx extends reporting power of Platium Series", PC Weeks, vol. 8, No. 5, p. 29(2), Feb. 1991.*

Forbes, J. et al., "Palm PCs get a Big Hand (What's Hot)", Windows Magainze, No. 905, p. 96, May 1998.*

Penwarden, M., "More Muscle for HP's OmniBook", Windows Magazine, No. 501, p. 110, Jan. 1994.*

Feigel, C., "IBM, Motorola preview embedded PowerPCs; 403 and 505 processors combine strong performance with low cost", Microprocessor Report, vol. 8, No. 6, pp. 1–5, May 1994.*

Bursky, D., "Evolving DSP chips do more", Electronic Design, vol. 38, No. 23, pp. 51–59, Dec. 1990.*

* cited by examiner

METHOD AND APPARATUS ALLOWING A BATTERY TO REGAIN CHARGE IN A HANDHELD DEVICE WITHOUT AN APPLIED EXTERNAL CHARGE WHILE STILL SUPPLYING POWER SELECTED DESIGNATED COMPONENTS

Matter enclosed in heavy brackets [ ] appears in the original patent but forms no part of this reissue specification; matter printed in italics indicates the additions made by reissue.

RELATED APPLICATIONS

This application incorporates by reference in its entirety the content of U.S. patent application Ser. No. 09/587,087, entitled Power Management System for a Handheld Computer, filed May 31, 2000.

BACKGROUND OF THE INVENTION

1. Field of the Invention

This invention relates to the field of handheld computers. In particular, the invention relates to battery management of handheld computers.

2. Description of the Related Art

Handheld computers are portable battery-operated units. Typically, handheld computers are used in the field, or carried on a person. The handheld computers may be docked with personal computers to exchange or synchronize information. Functions provided by handheld computers include management of databases, such as for example, calendars and phone numbers.

Battery management is an important consideration for handheld computers. Improved battery management preserves costs associated with replacing batteries for the handheld computer.

Increasingly, handheld computers employ rechargeable batteries. To recharge batteries, handheld computers are docked in docking stations or coupled to electrical outlets. The portability of these handheld computers is limited by the need to recharge or replace the batteries of the handheld computer.

SUMMARY OF THE INVENTION

A handheld computer is provided a regulator to manage a battery module. The regulator receives a battery voltage, and outputs a regulated voltage for logical components of the handheld computer. When an amplitude of the battery voltage is greater than a designated operational voltage level, the regulator reduces or bucks the battery voltage to output a regulated voltage profile for components of the handheld computer. When the amplitude of the battery voltage is less than the designated operational voltage, the regulator implements a full duty-cycle to output an unregulated voltage that matches the battery voltage being supplied to the regulator.

DETAILED DESCRIPTION

A. System Overview

An embodiment of the invention provides a regulator for a handheld computer. The regulator receives a voltage supplied from a battery module, and outputs a logic level voltage to components of the handheld computer. The regulator regulates the battery voltage to extend the life of the battery module.

In an embodiment, the regulator implements a bypass when the battery voltage drops below a designated level. When the bypass is implemented, the output of the regulator matches the battery voltage received by the regulator. In an embodiment, handheld computer can perform some functions when the bypass mode is implemented, such as maintain a sleep mode, preserve memory, or sound an alarm. In another embodiment, handheld computer 100 includes a monitoring module to remove most of the load from the battery, when the voltage level of the battery module drops below a certain level. When the load is removed, the battery module regains some voltage. The extended life of the battery module is then used to preserve memory.

Among other advantages, embodiments of the invention provide for a handheld computer having an extended battery life. Further, regulating components such as voltage boosters are eliminated, thereby simplifying regulator circuitry and extending battery life of the handheld computer.

B. Handheld Computer for Use with an Embodiment

Figure 1:
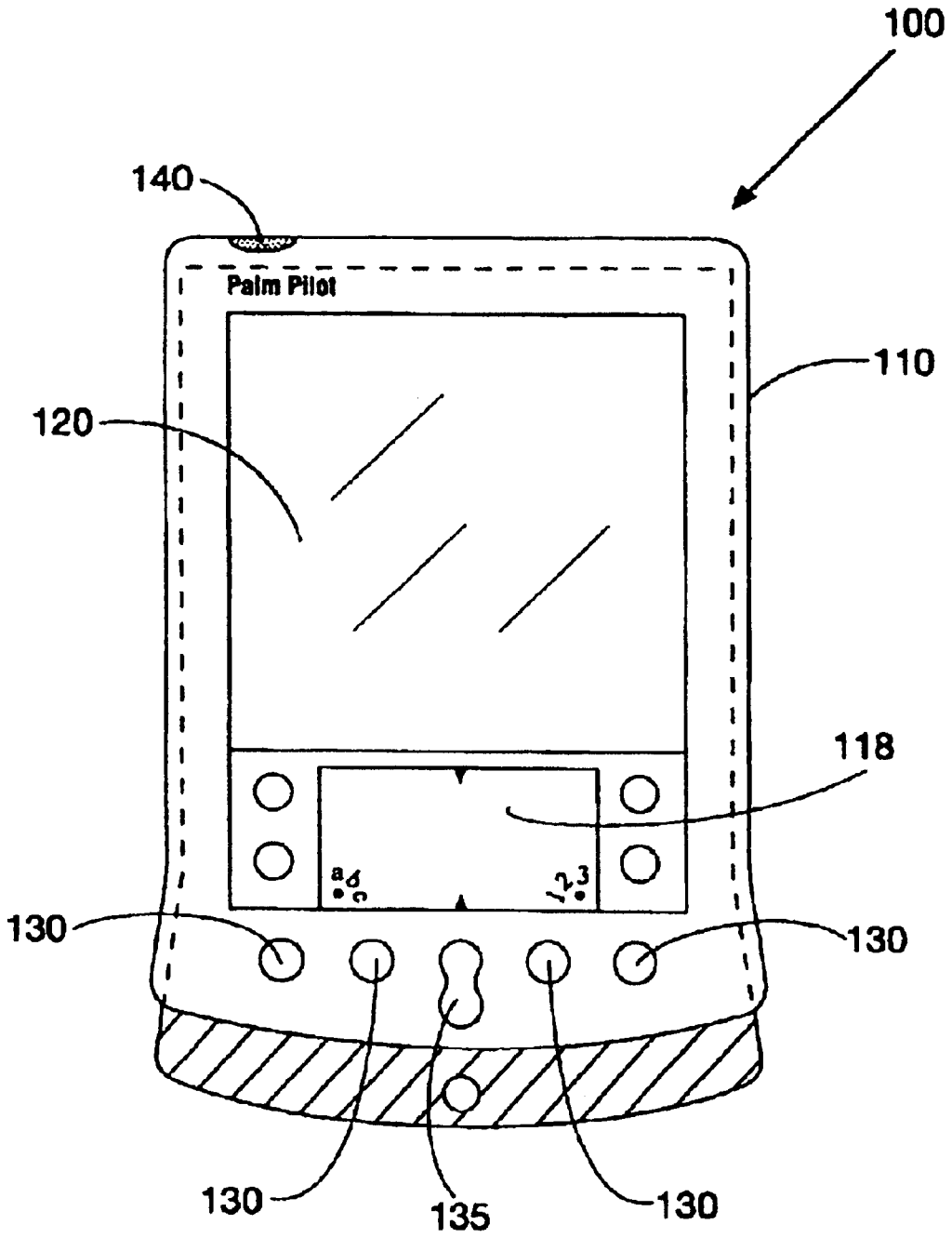
FIG. 1 (PRIOR ART)
FIG. 1 illustrates a handheld computer, under an embodiment of the invention.

FIG. 1 illustrates a handheld computer 100 for use with an embodiment of the invention. An exemplary handheld computer includes, for example, Palm Pilot®, Palm III®, Palm V® or Palm VII® organizer manufactured by Palm, Inc. Other exemplary handheld computers include devices operating on a Windows CE® operating systems.

In an embodiment, handheld computer 100 includes a housing 110. A display 120 is accessible from a front of the housing 110. The display includes a Graffiti® writing section 118 to allow users to select menus and enter information. A plurality of application buttons 130 are available from the front of the housing 110. A rocking switch actuator 135 is positioned on a surface of housing 110 to manipulate or change the configurations of display 120. A speaker (not shown) may be provided on a surface of the housing 110.

The handheld computer 100 may include an infra-red port 140 to transfer and receive information across one type of wireless medium. The handhled computer 100 may also include a port to enable communications with another device, such as for example a communication cradle (not shown). The communication cradle may be employed to synchronize or transfer information to another computer, such as a desktop computer.

The handheld computer 100 may operate in different power states. As described herein, handheld computer 100 may be awake, in which case input and output components of handheld computer are operable. The handheld computer 100 may be asleep, in which case the handheld computer is operable, but not active. When sleeping, handheld computer may be switched to an awake state through user-input. The handheld computer 100 may also implement a lock-out, in which case the handheld computer may be asleep or operating in a reduced power state, while locking the user out from powering the computer to an awake state. In one embodiment, battery power is used primarily to preserve memory when handheld computer 100 is in the lock-out state. The handheld computer 100 may also be in a reset state. In the reset state, the handheld computer 100 is detached from a battery source, until sufficient power is detected from the battery to erase the memory.

C. Process Flow for Managing Power to Handheld Computer

Figure 2:
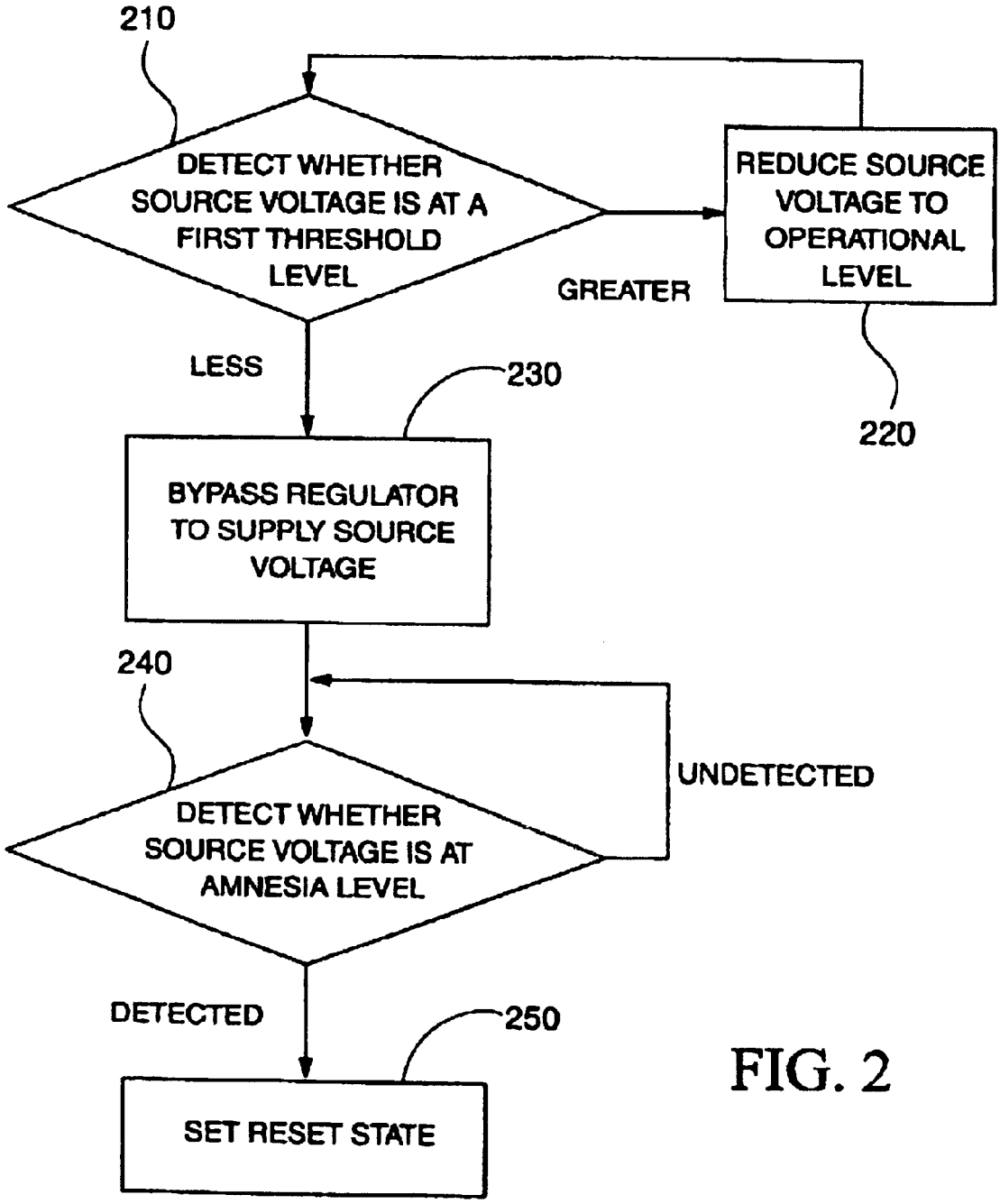
FIG. 2 is a flow process for managing power in a handheld computer, under an embodiment of the eon.

FIG. 2 illustrates a process for operating a power management system, under an embodiment of the invention. The process may be implemented on handheld computer 100 through use of hardware components. However, other embodiments may implement the flow process through firmware, software, or a combination of hardware and programming.

Figure 4:
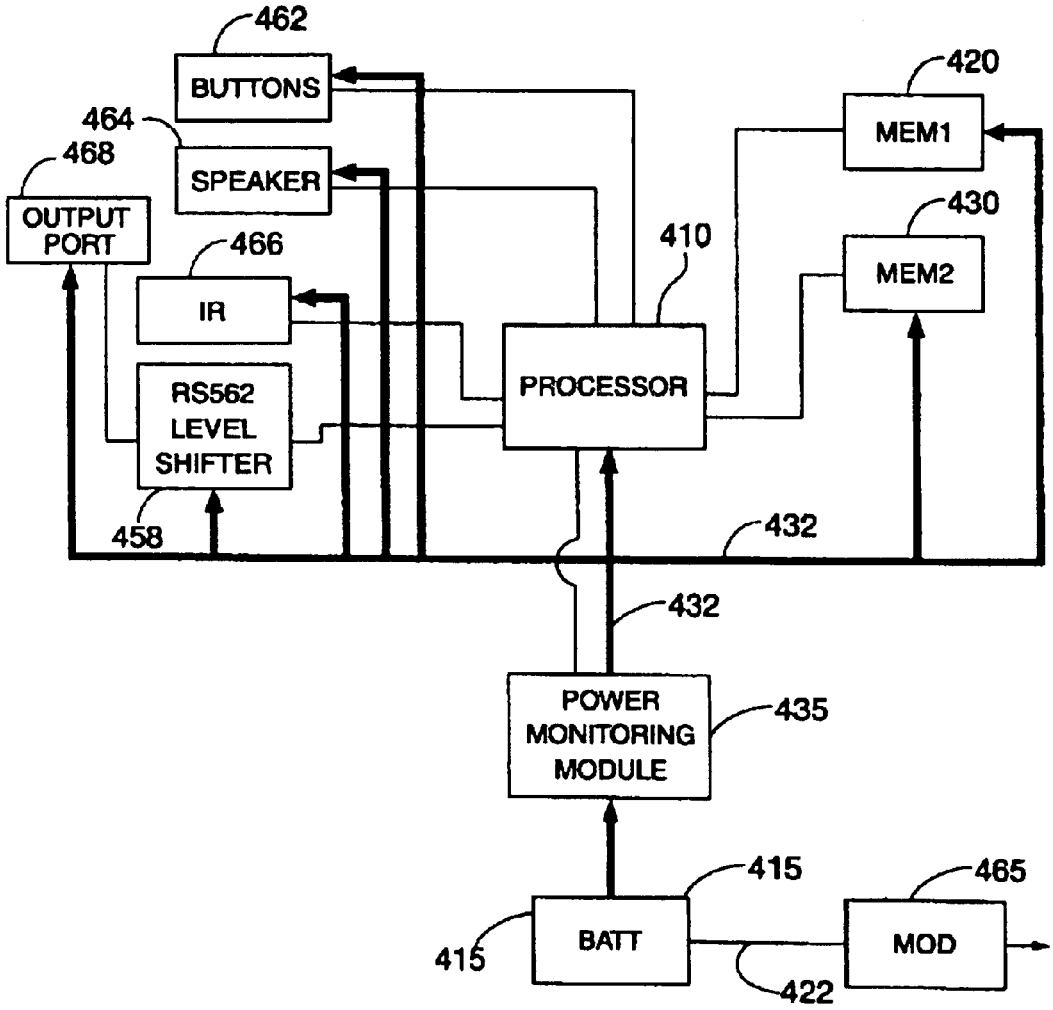
FIG. 4 is a block diagram of internal components of a handheld computer, under an embodiment of the invention.

For discussion, handheld computer 100 is assumed to operate off of a rechargeable battery module 415 (see FIG. 4). The battery module may include one or more individual batteries. Preferably, the battery modules are lithium-ion type batteries. The battery module supplies a source voltage to power internal components of the handheld computer that operate at logic levels, including a processor 410 (FIG. 4) and a memory 420, 430 (FIG. 4). The battery module may also provide one or more voltages that are modified for other components not operating under logic levels. For example, the battery module may provide voltages that are raised or stepped to power displays, digitizers and/or analogdigital converters.

In step 210, the source voltage from a rechargeably battery module 415 is detected as to whether the source voltage is greater than a first threshold level. Preferably, the first threshold level is an operational level designated for handheld computer 100. The operational level includes a voltage level range that is suitable for executing logical operations by internal components of handheld computer, including processor 410 and memory 420, 430. In an embodiment, the designated operational voltage level may range between 3.0 and 3.4 volts, and preferably is about 3.2 volts. When the battery module is fully charged, the source voltage is greater than the designated operational level. For example, the maximum source voltage can be between 4.2–4.4 volts. Without the battery module being recharged, the source voltage drops to the first threshold, where it is detected.

If the level of the source voltage is greater than the operational level designated for handheld computer 100, then the source voltage is reduced in step 220 to the operational level designated for handheld computer 100. The source voltage may be reduced by regulator 550, shown in FIG. 5.

If the level of the source voltage is less than the detected level, then in step 230, the regulator is bypassed, and the source voltage is directly supplied to at least some of the internal components of the handheld computer. The handheld computer 100 does not buck or boost the source voltage in supplying the source voltage to the handheld computer 100. This is in contrast to other devices, which may boost the source voltage to the operational level.

In an embodiment, the regulator is bypassed only when the source voltage level is at a level that cannot feasibly sustain normal operations of the handheld computer 100. In one embodiment, once the source voltage falls below the designated operational level of the handheld computer 100, handheld computer 100 initiates a lockout of the software to preserve memory data. During the lockout, the processor performs minimal functions, while memory is being sustained. User-interaction is prevented during the lock-out. Other internal components of handheld computer 100 may be signaled to stop drawing power from the battery module.

Preferably, the designated operational level is 3.6 volts. When the source voltage is greater than 3.6 volts, the regulator reduces the source voltage to 3.6 volts. Once the source voltage decreases below 3.6 volts, the source voltage passes through the regulator with no voltage modification.

In step 240, the source voltage is detected as to whether the source voltage is at an amnesia level. At the amnesia level, the source voltage is not sufficient to perform basic operations, such as sustaining memory. Prior to reaching this level, most components of handheld computer 100 should have been switched off to stop drawing power from the battery module.

If the source voltage is detected to be at the amnesia level, then in step 250, handheld computer 100 is in a reset state. The battery module is detected from the processor and memory. Once the battery module is recharged, all memory in handheld computer is erased. This avoids hardware damage to components of handheld computer 100, including the memory 420, 430.

In other embodiments, the source voltage may initially be detected for a level that is different than the designated operational level of the handheld computer 100, while the regulator 550 (FIG. 5) may be configured to output the source voltage at the designated operational level of the handheld computer. For example, the source voltage may be detected for a level of 3.8 volts. If the source voltage is greater than 3.8 volts, then the regulator reduces the source voltage to 3.6 volts. Once the source voltage falls below the first detected level, then the source voltage is unregulated.

Still further, in other embodiments, once the source voltage falls below the first threshold level, additional components of the handheld computer 100 other than processor 410 and memory 420, 430 may be operable. For example, a user may still input data through application buttons, or use a serial port to synchronize information from handheld computer 100 to a desktop.

Figure 3:
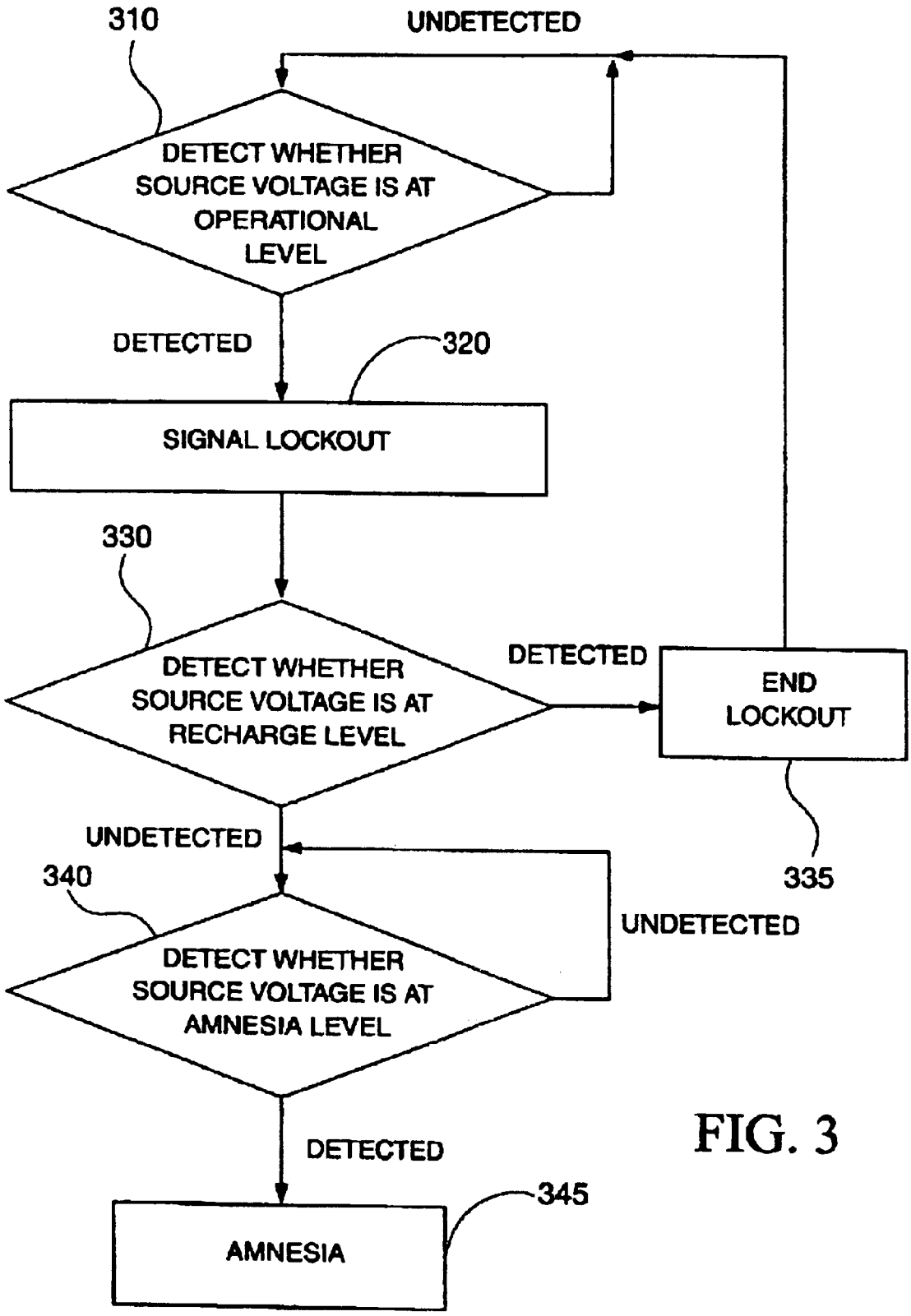
FIG. 3 is a flow process for managing power in a handheld computer, under an embodiment of the intention.

FIG. 3 illustrates another power management process for handheld computer 100, under another embodiment of the invention. With a process described by FIG. 3, handheld computer 100 employs a "keep alive" voltage to preserve memory. Certain types of battery modules have an inherent characteristic of regaining some voltage once a load is removed from the battery. In particular, lithium type batteries exhibit an inherent property of regaining voltage levels after the load is removed or reduced. In an embodiment, handheld computer 100 includes a battery module 415 (see FIG. 4) having this inherent feature to prolong the duration in which memory can be preserved, without recharging the batteries.

In step 310, the source voltage is detected as to whether the source voltage is at the designated operational level. If the source voltage is detected to be at or below the operational level, then a lockout is initiated in step 320. During the lockout, internal components of handheld computer 100, including input and output mechanisms, are switched to stop drawing power from the battery module. The handheld computer 100 also locks out the user from being able to awaken the processor or operate it in anyway. Preferably, the processor and memory are the only components receiving power from battery module. In this way, most of the load on the battery module is removed, so that the battery module to regain some of its voltage without receiving an external charge.

The increase charge to the battery module 415 once the load is removed is referred as the "keep-alive" voltage. The keep-alive voltage is used to sustain memory voltage within handheld computer 100. In a keep-alive mode, the lockout remains in force while the battery module 415 is allowed to increase.

In step 330, the source voltage is detected to determine if the level of the source voltage is greater than a recharge level. The recharge level indicates that the battery module 415 is recharged. In an embodiment, recharge level is sufficiently greater than the operational level of handheld computer 100 to indicate that the increased charge level is not a result of inherent chemical characteristics of the battery module 415, but rather the actual presence of an external change. Preferably, the recharge level is 3.7 volts.

If the source voltage is detected to be greater than the recharge level, then in step 335 the processor is signaled to end the lockout. The flow process then returns to step 310.

If the source voltage is not detected to be greater than the recharge level, then in step 340, the source voltage is detected again to determine whether the source voltage is at the amnesia level. The amnesia level corresponds to a minimum voltage designated as being the cut-off for avoiding damage to handheld computer 100. In an embodiment, the amnesia level is about 2.8 volts.

Once the source voltage is detected as falling below the amnesia level, the handheld computer 100 resets in step 345. This includes erasing the memory to avoid damage.

In other embodiments, software features may be included to assist managing power to components of handheld computer 100. In one embodiment, the source voltage is detected to be at a warning level. For example, the warning level may be 3.76 volts. One or more detectors may be used to detect the source voltage from the battery module and to signal the processor when the source voltage is detected to be below the warning level. If the source voltage is detected to be at the first warning level, then the warning condition is signaled to a user of handheld computer 100. Preferably, the warning condition is an audible or visual alert.

The handheld computer 100 may be operable after the first warning condition is satisfied. For example, the processor may be awakened by user-input to execute one or more applications. Further, data may be entered into handheld computer 100, display 120 may be powered to display data, etc.

If the source voltage is detected to be at the first warning level, then a second warning condition may be detected. Preferably, the second warning condition is detected by processor 410 (FIG. 4) if the battery module 415 (FIG. 4) is not recharged during a designated time period after the source voltage was detected to be at the first warning level. For example, the second warning condition may be detected if handheld computer 100 remains in a sleep state for three days without being charged. The second warning condition may also be detected if handheld computer 100 is operated in an awake state for 60 minutes after the first warning condition is satisfied.

D. Hardware for Power Management System of Handheld Computer

FIG. 4 illustrates a block diagram of handheld computer 100, using a rechargeable battery module 415 under an embodiment of the invention. A power monitoring module 435 is coupled to the battery module 415. The power monitoring module 435 regulates the source voltage for the internal components of the handheld computer 100.

In an embodiment, handheld computer 100 includes internal components such as processor 410, volatile memory 420, and non-volatile memory 430. The processor 410 is coupled to application buttons 462, a speaker 464, an IR port 466, and an output port 468. Other components that can be signaled by processor include universal asynchronous (UART) (not shown). The power monitoring module 435 signals processor 410 information about the voltage level of the battery module 415 to enable the processor 410 to manage the load on the power supply.

In an embodiment, the first and second memory components 420, 430 may comprise a Flash memory and a dynamic random access memory (DRAM). An RS 432 level shifter 458 couples processor 410 to output port 468. In an embodiment, output port 468 is used to establish communications with another computer such as a personal computer. Preferably, processor 410 is a Dragonball 68328EZ®, manufactured by the Motorola Corp.

A power rail 432 carries the source voltage to components of handheld computer 100 that operate at logic levels. The power monitoring module 435 receives the source voltage from the battery module 415. The power monitoring module 435 controls the source voltage being supplied to power rail 432.

In an embodiment, power monitoring module 435 reduces the source voltage when the source voltage is above the operational level of handheld computer 100. In addition, the source voltage is fed directly to power rail 432 when the level of the source voltage falls below a specified level, preferably below the operational level of handheld computer 100. Further, power monitoring module 435 is configured to allow a keep-alive voltage of the rechargeable battery module to maintain memory operations in handheld computer 100. The power monitoring module 435 includes components to signal the processor 410 detection levels of the source voltage. The processor 410 then implement the power management controls.

With further reference to FIG. 4, an embodiment includes a voltage modifier 456 may receive a battery input via a display power line 422. The voltage modifier 456 converts the direct current (DC) on display power line 422 to an alternating voltage with a high-gain amplitude.

Figure 5:
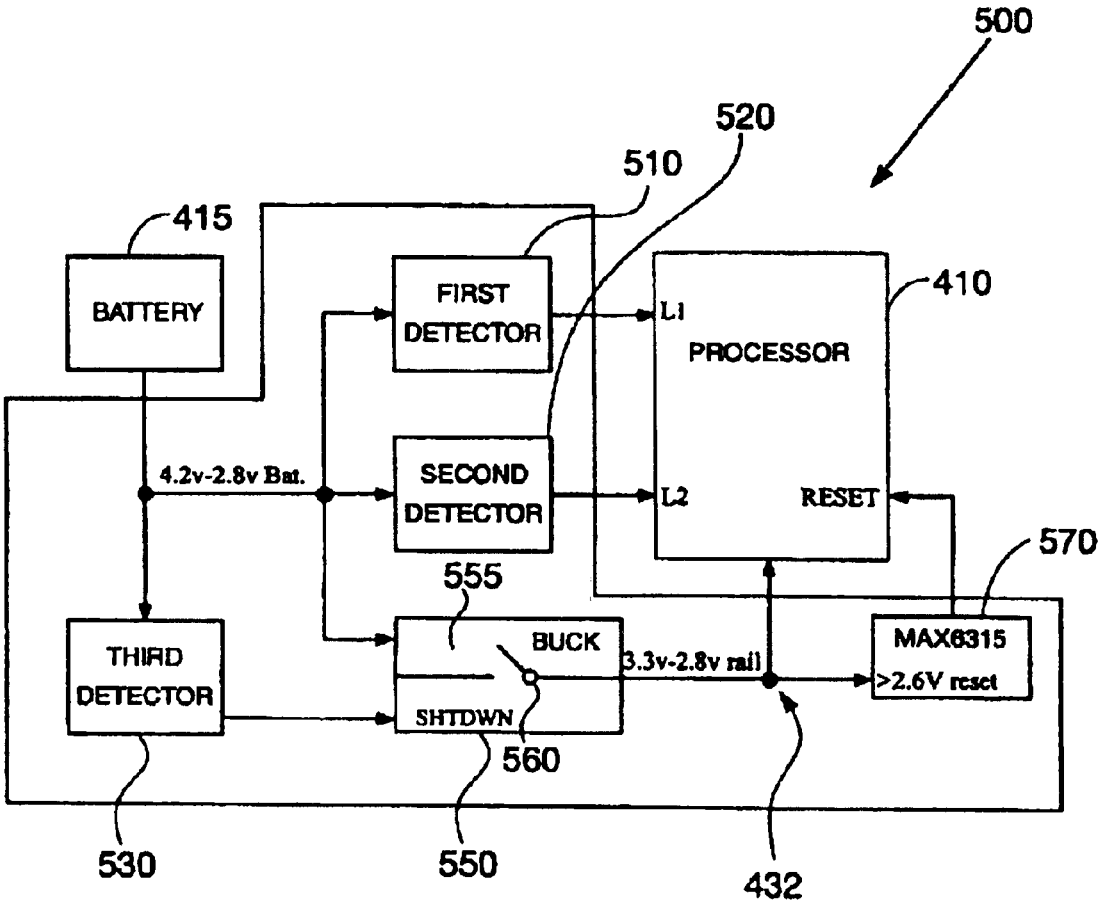
FIG. 5 is a block diagram of a handheld computer with a power management module under an embodiment of the invention.

Referring to FIG. 5, a block diagram illustrates the power management system 500, under an embodiment of the invention. The power management system 500 includes rechargeable battery module 415, processor 410, and power monitoring unit 435. The power monitoring unit 435 includes first detector 510, second detector 520, third detector 530, and regulator 550.

In one embodiment, regulator 550 include a buck component 555. The buck component 555 refers to a characteristic or feature of regulator 550 that causes source voltage passing through the regulator to be reduced. The regulator 555 may also include a bypass switch 560. The bypass switch 560 is preferably an inherent characteristic of the buck component 555 or regulator 550. The bypass switch causes the source voltage to bypass the buck component at specific voltage levels. For example, switch 560 may be an inherent characteristic of the buck component 555, caused by inductive properties incorporated into the buck component 455. The inherent characteristics of regulator 550 determine a voltage at which the regulator stops regulating, and bypasses the source voltage from the battery module 415 to power rail 432. In an embodiment, the regulator bypasses the source voltage when the source voltage is at the operational level of handheld computer 100.

Alternatively, switch 555 can be a transistor tied to a switching voltage, and the switching voltage may correspond to the operational voltage of handheld computer 100 or another voltage. An example of this embodiment is shown with FIGS. 7 and 8.

In an embodiment, first detector 510 detects when the source voltage is at the operational level. Preferably, the minimum operational level is designated at approximately 3.2 volts. The first detector 510 signals processor 410 when the source voltage reaches this level. In response, processor 410 initiates a protective measure.

In an embodiment, the processor 410 initiates the lock-out state as the protective step. During the lock-out state, the processor 410 locks out the software, and signals other components to stop drawing power from rail 432. The remaining power from battery module 415 is used to sustain memory. Other minimal functions may be performed, but once the lock-out state is initiated by processor 410, the load on battery module 415 is significantly reduced, while memory is maintained.

A second detector 520 is coupled to the first detector 510 and the battery module 415 to detect a recharge event. A recharge event is detected by processor 410 only if the first detector 510 has already signaled the processor 410 that the source voltage is below the operational level. If recharge is detected by processor 410 from second detector 520, both the first and second detectors are reset.

The regulator 550 receives the source voltage from battery module 415. The regulator reduces the source voltage if the source voltage is greater than the operational level of handheld computer 100. If the source voltage falls below the operational level, the regulator 550 passes the source voltage through without modification. In an embodiment, buck component 555 of regulator 550 is bypassed once the source voltage falls below the operational level. The bypass maybe implemented by switch 560. Inherent features of the regulator 550 detect the level of the source voltage. Therefore, regulator 550 operates independently of the detectors 510–530.

As mentioned, when first detector 510 is triggered, processor 410 initiates the lock-out to preserve memory data. This reduces the load on the battery module 415, allowing the battery module to increase in voltage. The level of the source voltage may increase above the operational level again, once the first detector 510 is triggered. However, since second detector 520 must be triggered before first detector 510 is reset, the lock-out is not terminated. The second detector 520 is set to detect a voltage level that is sufficiently large to clearly indicate a recharge event, rather than an inherent increase due to the chemistry of the rechargeable battery.

The third detector 530 detects when the source voltage reaches a minimum level for sustaining memory operations. If the third detector is triggered by the source voltage reaching the amnesia level, power on the rail 432 is discontinued. Upon a subsequest power-up, if the source voltage is detected to be greater than the amnesia level, reset mechanism 570 signals processor 410 to reset the handheld computer.

E. Voltage Profiles for Handheld Computer

Figure 6:
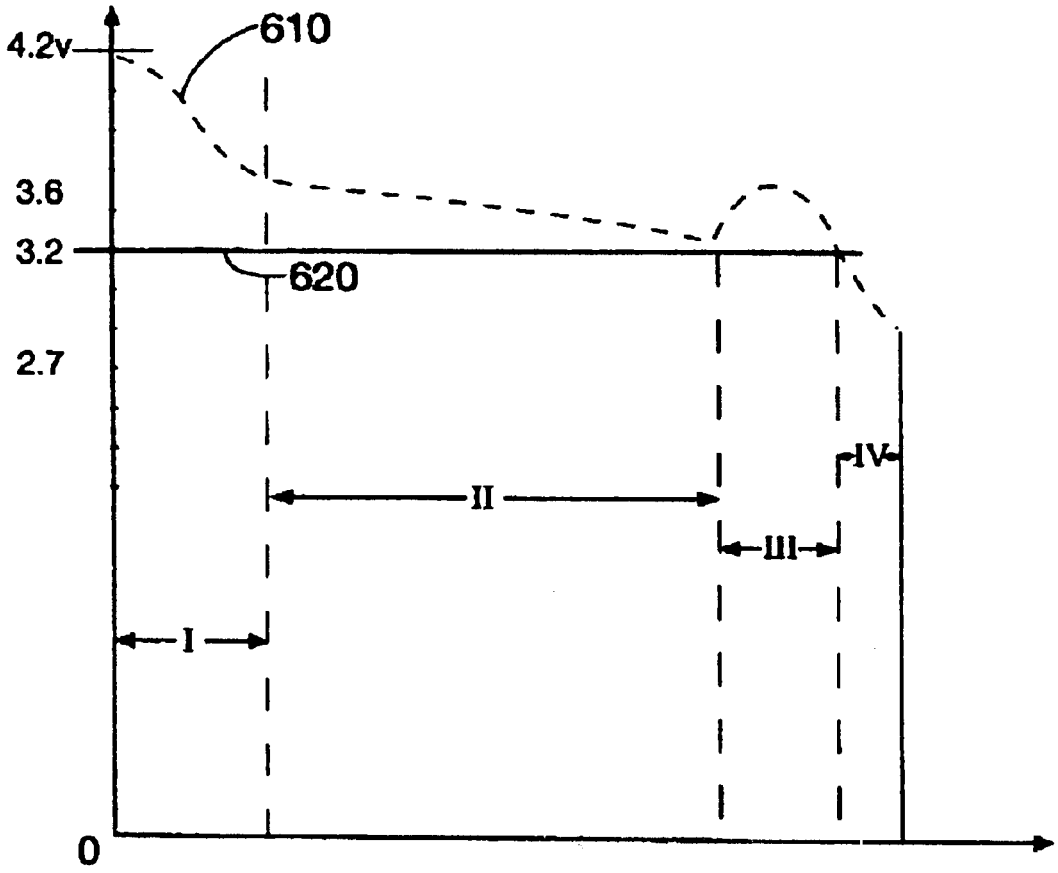
FIG. 6 is a voltage profile diagram for an output of the regulator such as shown by FIG. 3, compared output of a battery module for the handheld computer.

FIG. 6 is a voltage profile illustration of a profile for the source voltage from battery module 415 (source voltage profile) compared with an output of regulator 550 to rail 432 (rail voltage profile), under an embodiment of the invention. The comparison illustrated by FIG. 6 assumes that battery module 415 is used continuously from a maximum charge without being recharged. For reference, the source voltage profile is designated by numeral 610. The rail voltage profile is shown by numeral 620. Voltage values provided in FIG. 6 or elsewhere in the text are provided as examples.

In an embodiment, source voltage profile 610 corresponds to an output of the battery module 415 comprising a Lithium-ion type battery pack. When the battery module 415 is operated from a fully charged state with no additional power input, the amplitude of the source voltage profile 610 is assumed to decrease continuously while handheld computer 100 is used frequently. However, the features and characteristics of the source voltage profile 610 depend on the nature of use of handheld computer 100, as well as the power consumption characteristics of handheld computer 100.

The source voltage profile 610 is described with respect to multiple time intervals. In Interval I, the amplitude of source voltage profile 610 decreases non-linearly from a maximum voltage level. In one embodiment, the maximum voltage level may be approximately 4.2 volts.

In Interval II, the source voltage profile 610 decreases gradually from an initial steady-state voltage level. The initial steady-state range may correspond to 3.6 volts. For description, Interval II ends when the source voltage profile 610 has an amplitude equal to the operational level of handheld computer 100. During Interval I and II, the regulator 550 reduces the source voltage to a constant level corresponding to the operational level designated for handheld computer 100. As a result, the rail voltage profile 620 is constant during Interval I and II.

During Interval I and II, the source voltage provided on rail 432 is sufficient to enable a user to have complete use of handheld computer 100. However, during Interval I and II, warning levels may be detected by software-implemented power management systems.

In Interval III, the load applied to source voltage profile 610 is removed. The load may be removed when processor 410 implements the software lockout of handheld computer 100. The reduction of the load on the battery module 415 causes an increase in source voltage profile 610, due to internal resistence of the rechargeable battery module 415. The rise in voltage in Interval III is the "keep-alive" voltage. During keep-alive, the peak of the source voltage may be as much as 3.6–3.7 volts. The "keep-alive" voltage is used primarily to preserve the data in the memory when the load on the battery module 415 is reduced.

During Interval III, the regulator 550 preferably reduces the source voltage when the source voltage is detected to be above the minimum operational level of handheld computer 100. This prolongs the duration of the "keep-alive" voltage (Interval III). The rail voltage profile 620 is therefore constant, at the designated operational level of handheld computer 100.

During Interval IV, source voltage profile 610 decreases below the operational level of handheld computer 100. Once the level of the source voltage drops below the operational level, the regulator 550 feeds the source voltage to power rail 432 without modification. When the regulator 550 is bypassed, the source voltage and rail voltage profiles 610 and 620 exhibit the same or similar behavior. In other words, the rail voltage profile 620 decreases with the source voltage profile 610.

In an embodiment, regulator 550 includes buck component 555, which is bypassed during Interval IV. Before regulator 550 is bypassed, the rail voltage profile 620 represents a fractional duty cycle of source voltage profile 610. After the buck component 555 is bypassed, the rail voltage profile 620 represents a full duty cycle of source voltage profile 610.

From the maximum, the source voltage profile 610 and rail voltage profile 620 may decrease sharply from the peak of the "keep-alive" voltage. During Interval IV, the voltage carried on rail 432 is used to preserve the memory data. Unless a recharge is detected, the level of the source voltage decreases until the amnesia level (2.8 volts) is detected, and then handheld computer 100 is reset.

In this way, the "keep-alive" voltage (Interval IV) extends the duration in which memory can be preserved without recharging the handheld computer 100. Moreover, use of regulator 550 to reduce the source voltage to the operational level extends the life of battery module 415 with one charge.

In contrast, other known handheld computers do not implement a bypass mode or full-duty cycle when powered by a rechargeable battery. Some other devices implement a booster to boost the level of the source voltage. This reduces the time in which the user of handheld computer can recharge the battery without losing memory data.

F. Alternative Embodiments

Figure 7:
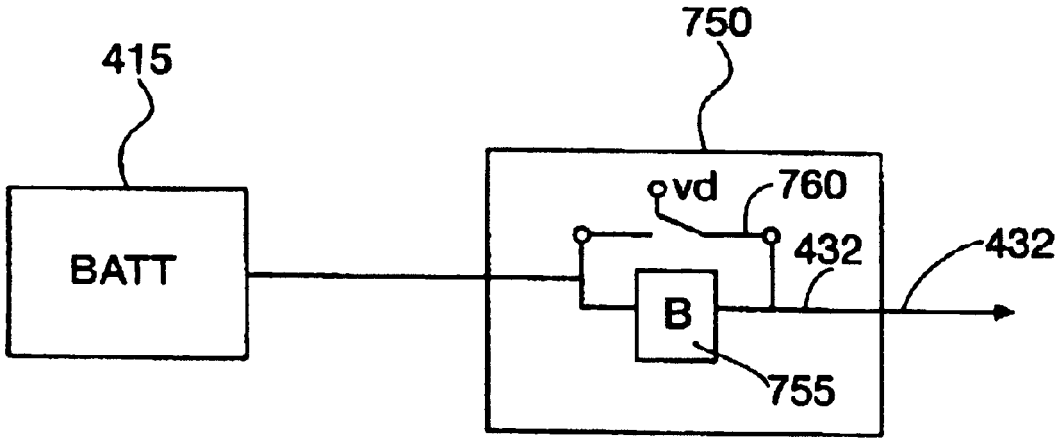
FIG. 7 illustrates another regulator including a switching element to affect regulating characteristics, under an embodiment of the invention.

FIG. 7 illustrates a regulator 750 for use with handheld computer 100, under another embodiment of the invention. As with embodiments described by FIG. 3, regulator 750 may be coupled within handheld computer 100 to regulate the source voltage profile from battery module 415.

The regulator 750 may include a regulator switch 760 to switch the regulator into the bypass. The regulator switch 760 may be set to switch the source voltage so as to bypass the buck component 755 regulator 750. Thus, the regulator 750 may implement the bypass at a voltage determined by the regulator switch 760. The regulator switch 760 may be tied to a specific voltage to determine the switching level.

Figure 8:
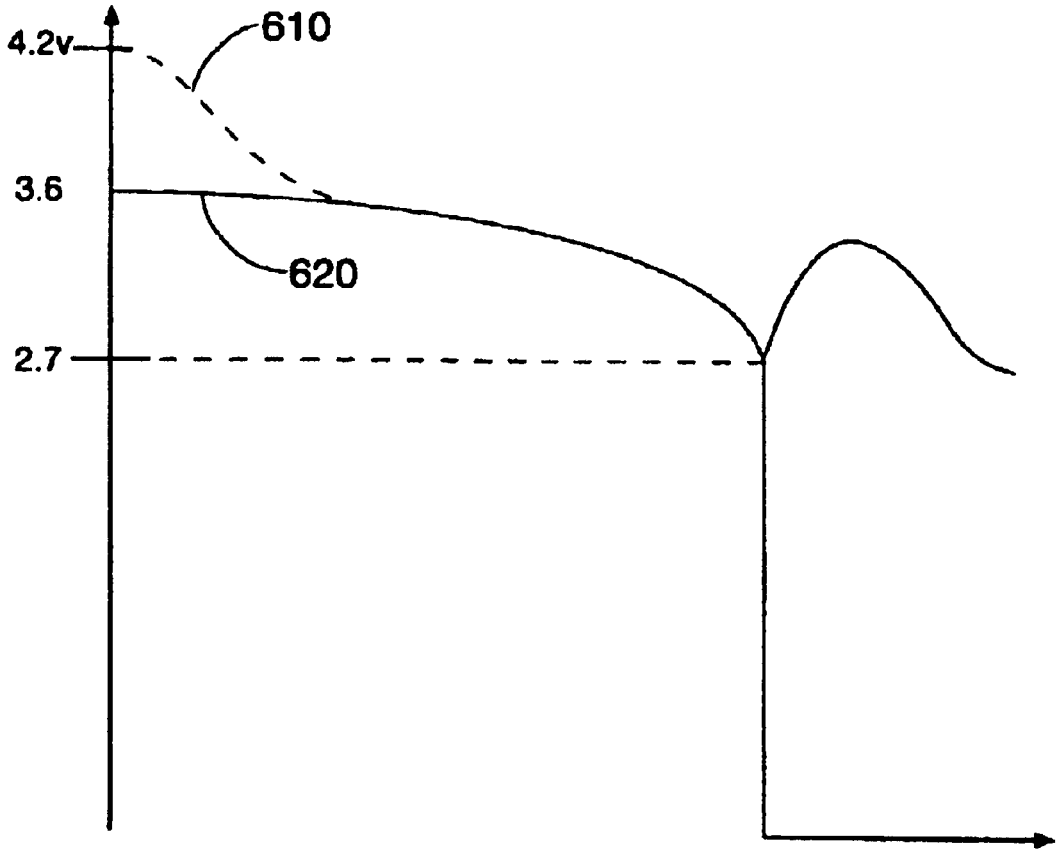
FIG. 8 is a voltage profile diagram of an output of the regulator such as shown by FIGS. 3 and 7, compared with an output of a battery module of the handheld computer, under an embodiment of the invention.

FIG. 8 is a voltage profile illustration of the source voltage profile 610 compared with the rail voltage profile 820 for regulator 750. As shown by an embodiment of FIG. 8, regulator 750 is set so that buck component 755 is bypassed at a voltage determined by the switching voltage of a regulator switch 760. The rail voltage profile 820 matches the source voltage profile once the source voltage is detected to beat the switching voltage. In this embodiment, rail voltage profile 820 enables handheld computer 100 to include more functionality. The lock-out feature may still be implemented to create a keep-alive voltage. If the rail voltage profile 820 matches the source voltage profile 610, then the increased voltage could be used to increase functionality to handheld computer 100 during the "keep-alive", albeit for a shorter time period.

In an embodiment such as shown by FIGS. 7 and 8, the regulator switch 460 may be set approximately to, for example, 3.6 volts. Once the voltage supplied from battery module 415 decreases to the switching voltage, regulator switch 760 causes buck component 755 to be bypassed. As a result, power rail 432 is supplied voltage from battery module 415 at a full duty-cycle. The switching voltage and regulator switch 760 may be manipulated to allow buck component 755 to be bypassed at a different switching voltage. This allows power rail 432 to operate off a full duty-cycle sooner or later in relation to the source voltage profile 610.

G. Examples of Regulator Components

An example of a regulator for use with an embodiment such as described with FIGS. 5–7 is a 1474 Linear Tech power supply controller, manufactured by Linear Tech Inc. The 1474 Linear Tech controller includes an inductive component to cause the source voltage to bypass modification. Further, 1474 Linear Tech controller produces an output such as described with FIG. 6. An additional switch may be employed with the 1474 Linear Tech component to create a regulator profile such as described with FIG. 8.

As an alternative, a low drop-out (LDO) regulator may be employed with an embodiment of the invention. An example of a LDO regulator includes 801 Seiko LDO, manufactured by Seiko Inc. While the LDO regulator may lack an inductive component such as described with FIGS. 3 and 5, the LDO regulator may provide bucking characteristics similar to embodiments described with FIGS. 5–7. A switch may be used to implement the bypass of the source voltage to the power rail 432.

H. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A handheld computer comprising:

a rechargeable battery module to output a source voltage;

a power management module coupled to the battery module to regulate the source voltage from the battery module;

a plurality of internal components including a processor and a memory component that draw power from the source voltage; and wherein in response to the source voltage falling below a first threshold, the power management module signals a lockout that reduces the number of internal components that are powered by the source voltage;

wherein in response to the number of internal components that are powered by the source voltage being reduced, —the battery module is configured to regain a charge for an interval after the lockout is signaled, wherein no external charge is applied to the battery module during the interval; and wherein during the interval, the battery module applies the charge to maintain the source voltage at a level that is sufficient to sustain a designated one or more, but not all, of the plurality of internal components.

2. The handheld computer of claim 1, wherein the level of the source voltage that is sufficient to sustain the designated one or more of the plurality of internal components has a peak of between 3.3 and 3.6 volts.

3. The handheld computer of claim 2, further comprising a rail coupled to the power management module to extend the source voltage to the plurality of internal components.

4. The handheld computer of claim 1, wherein the designated one or more of the plurality of internal components includes at least one of the—memory component and the processor.

5. The handheld computer of claim 2, wherein the power management module signals the sustaining source voltage to only the memory component and the processor in the plurality of internal components, and wherein the plurality of internal components include a display, a speaker, and an input device.

6. The handheld computer of claim 1, wherein the power management module signals the lockout to the processor, and the processor causes some of the components in the plurality of components to stop drawing power from the battery module.

7. The handheld computer of claim 3, wherein the power management module includes a first detector to detect when the source voltage is below the first threshold.

8. The handheld computer of claim 7, wherein the first threshold corresponds to an operational level of the handheld computer.

9. The handheld computer of claim 7, wherein the power management module includes a second detector to detect when the source voltage declines to an amnesia level that is designated to trigger the memory component to be erased.

10. The handheld computer of claim 8, wherein the power management module signals the source voltage from the battery module to the rail without regulating the source voltage when the source voltage decreases below the operational level of the handheld computer.

11. The handheld computer of claim 1, wherein the battery module is a lithium type rechargeable battery.

12. The handheld computer of claim 9, wherein the first threshold is between 3.0 volts and 3.6 volts.

13. The handheld computer of claim 12, wherein the first threshold is approximately 3.2 volts.

14. The handheld computer of claim 9, wherein the amnesia level is approximately between 2.7 and 2.9 volts.

15. The handheld computer of claim 14, wherein the amnesia level is approximately 2.8 volts.

16. A method for regulating power to a handheld computer, the method [comprising] *comprising:* receiving a source voltage from a battery module;

regulating the source voltage to power a plurality of internal components, the plurality of components including a processor and a memory component;

detecting if the source voltage is less than a first threshold;

in response to detecting the source voltage is less than the first threshold, for an interval during which no external charge is applied to the battery module, reducing the plurality of internal components powered by the source voltage; in order to allow a [charge] *voltage* of the battery module to increase; and sustaining a designated one or more, but not all, of the plurality of internal components during the interval.

17. The method of claim 16, wherein sustaining a designated one or more of the plurality of internal components during the interval *includes sustaining* the memory component.

18. The method of claim 17, further comprising the step of detecting when the source voltage drops below an operational level of handheld computer, and stopping one or more of the plurality of internal components from drawing power from the battery module when the source voltage is less than the operational level.

19. The method of claim 16, further comprising the step of detecting when the source voltage reaches an amnesia level subsequent to the source voltage reaching the operation level.

20. The method of claim 19, further comprising erasing the memory component when the amnesia level is reached.

21. The method of claim 16, wherein regulating the source voltage to power a plurality of internal components includes reducing the source voltage while the source voltage is greater than an operational level of the handheld computer.

22. The method of claim 21, wherein reducing the source voltage while the source voltage is greater than an operational level of the handheld computer includes reducing the source voltage with a buck component.

23. The method of claim 22, wherein reducing the source voltage includes bypassing the buck component when the source voltage is less than the operational level of the handheld computer.

24. The method of claim 23, wherein the operational level of the handheld computer is approximately equal to the first threshold.

25. A handheld computer comprising:

a means for receiving a source voltage from a battery module;

a means for regulating the source voltage to power a plurality of internal components, including a processor and a memory component;

a means for detecting if the source voltage is less than a first threshold;

when the source voltage is detected as being less than the first threshold, for an interval during which no external charge is applied to the battery module, a responsive means for reducing the plurality of internal components powered by the source voltage in order to allow a [charge] *voltage* of the battery module to increase; and a means for sustaining a designated one or more, but not all, of the plurality of internal components during the interval.

*26. The handheld computer of claim 1, wherein the charge regained by the battery module results in an increase of the source voltage distributed by the battery module.*

*27. The method of claim 16, wherein receiving a source voltage from the battery module includes receiving the source voltage from a rechargeable battery module.*

*28. A method for regulating power to a handheld computing device, the method comprising:*

*distributing a source voltage from a rechargeable battery module to power a plurality of internal components, the plurality of components including a processor and a memory component;*

*detecting that the source voltage is less than a first threshold;*

*in response to detecting the source voltage is less than the first threshold, for an interval during which no external charge is applied to the battery module, enabling the rechargeable battery to increase the source voltage during the interval by reducing a sufficient number of the plurality of internal components powered by the source voltage; and*

*sustaining operations on a designated one or more, but not all, of the plurality of internal components during the interval.*

*29. The method of claim 28, wherein the plurality of components include a component for transmitting or receiving data across a wireless medium, and wherein reducing the plurality of internal components that are powered by the source voltage includes disabling the component while the processor is maintained operable to receive user-input and execute applications.*

*30. The method of claim 29, wherein reducing the plurality of internal components that are powered by the source voltage includes disabling the component while maintaining power to a display of the handheld computing device.*

*31. The method of claim 28, wherein reducing the plurality of internal components that are powered by the source voltage includes locking out a user from entering input to power or operate the handheld computing device.*

*32. The method of claim 31, wherein sustaining operations includes powering a memory of the handheld computing device with the source voltage to preserve data stored in the memory, wherein the memory is configured to otherwise lose the data but for being powered with the source voltage.*

*33. The method of claim 28, wherein sustaining operations on a designated one or more, but not all, of the plurality of internal components includes using the increased source voltage to power at least one of the designated one or more internal components.*

*34. The method of claim 28, wherein distributing a source voltage from a rechargeable battery includes regulating the source voltage when the source voltage is greater than a*

*second threshold, wherein the second threshold is greater than or equal to the first threshold.*

*35. The method of claim 34, wherein regulating the source voltage includes bucking the source voltage when the source voltage is at a level that is greater than the second threshold.*

*36. The method of claim 34, wherein regulating the source voltage includes regulating the charge output using a low drop-out regulator.*

*37. A handheld computing device comprising:*

*a rechargeable battery module to output a source voltage;*

*a power management module coupled to the battery module to regulate the source voltage from the battery module;*

*a plurality of internal components including a processor and a memory component that draw power from the source voltage; and*

*wherein in response to the source voltage falling below a first threshold, the power management module signals a lockout to enable the battery module to increase the source voltage, for an interval during which no external charge is applied to the battery module, by reducing a sufficient number of the internal components that are powered by the source voltage during the interval; and*

*wherein during the interval, the battery module applies the charge to maintain the source voltage at a level that is sufficient to sustain a designated one or more, but not all, of the plurality of internal components.*

*38. The handheld computing device of claim 37, wherein the first threshold corresponds to an operational level of the handheld computer.*

*39. The handheld computing device of claim 38, wherein the designated one or more of the plurality of internal components includes at least one of the memory component or the processor.*

* * * * *